United States Patent [19]

Sieg et al.

[11] Patent Number: 5,771,536
[45] Date of Patent: Jun. 30, 1998

[54] HANDLE ASSEMBLY FOR GRILL

[75] Inventors: Ewald Sieg, Palatine; James C. Stephen, Arlington Heights, both of Ill.

[73] Assignee: Weber-Stephen Products Co., Palatine, Ill.

[21] Appl. No.: 520,817

[22] Filed: Aug. 30, 1995

[51] Int. Cl.$^6$ .................................................. A47J 45/08
[52] U.S. Cl. ................. 16/114 R; 16/110 A; 16/116 R; 220/759
[58] Field of Search ............................ 16/114 R, 114 A, 16/116 R, 119, 110 A, 124, 125, 111 R, 110 R, DIG. 12, DIG. 19, DIG. 24, DIG. 20; 220/753, 755, 759; 401/3; 294/12, 26, 26.5, 27.1, 57, 58; 126/25 R; 30/340, 339

[56] References Cited

U.S. PATENT DOCUMENTS

| | | | |
|---|---|---|---|
| 1,235,309 | 7/1917 | Garretson | 16/116 R |
| 2,133,252 | 10/1938 | Moore et al. | 16/116 R |
| 2,146,415 | 2/1939 | Bradley | 16/116 R |
| 2,231,222 | 2/1941 | Rosenheimer, Jr. | 16/116 R |
| 2,488,309 | 11/1949 | Mason . | |
| 2,654,115 | 10/1953 | Kafer | 220/753 |
| 3,567,065 | 3/1971 | Dinse . | |
| 3,959,620 | 5/1976 | Stephen, Jr. | 126/25 R |
| 4,197,611 | 4/1980 | Bell et al. | 294/27.1 |
| 4,498,452 | 2/1985 | Schlosser et al. . | |
| 4,523,574 | 6/1985 | Schlosser . | |
| 4,535,749 | 8/1985 | Schlosser et al. . | |
| 4,791,702 | 12/1988 | McVey | 16/125 |
| 4,836,179 | 6/1989 | Schlosser et al. . | |

FOREIGN PATENT DOCUMENTS

| | | | |
|---|---|---|---|
| 59282 | 5/1913 | Austria | 16/116 R |
| 412816 | 1/1936 | Belgium . | |
| 1384152 | 11/1964 | France | 16/116 R |
| 45283 | 10/1908 | Switzerland | 16/116 R |
| 389279 | 5/1933 | United Kingdom | 16/119 |
| 594676 | 12/1947 | United Kingdom . | |
| 667040 | 2/1952 | United Kingdom | 16/116 R |
| 817416 | 7/1959 | United Kingdom . | |
| 1071291 | 6/1967 | United Kingdom . | |

*Primary Examiner*—Chuck Mah
*Attorney, Agent, or Firm*—Wallenstein & Wagner, Ltd.

[57] ABSTRACT

A handle 10 includes a strap 12 having a central portion 14 and a pair of legs 16 depending therefrom. The central portion 14 is substantially covered by an insulating material 18 which extends down a portion of each leg 16. The insulating material 18 has an arcuate upper profile 20 and an arcuate lower profile 22. Ribs 28 running generally transverse to the length of the handle are provided on the lower arcuate profile 22. The legs 16 are arcuate. The insulating material is applied as a first, upper part 30 and a lower part 32 which define a channel 34 between them to accommodate the strap 12. In a preferred embodiment, a thermally isolated bolt 42 joins the first and second parts 30, 32 together. Various other features to improve grip, control, and safety of a grill lid or bowl used in conjunction with the handle 10 are disclosed.

36 Claims, 3 Drawing Sheets

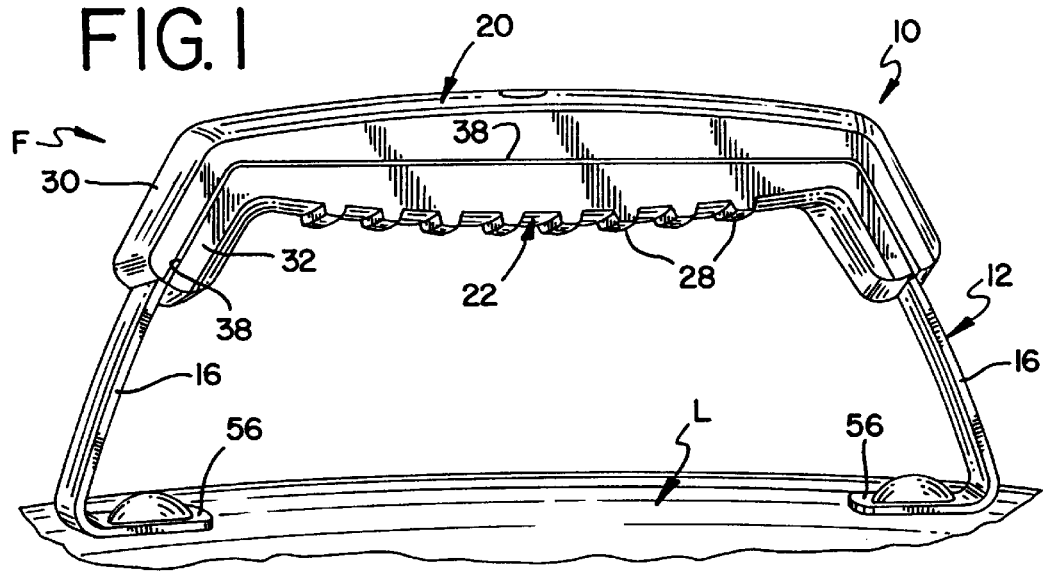
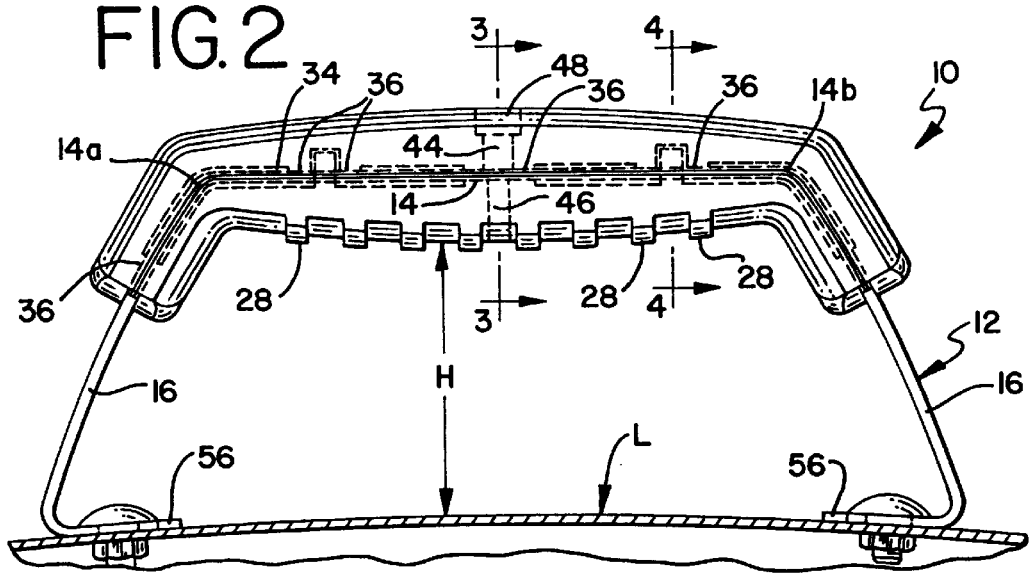
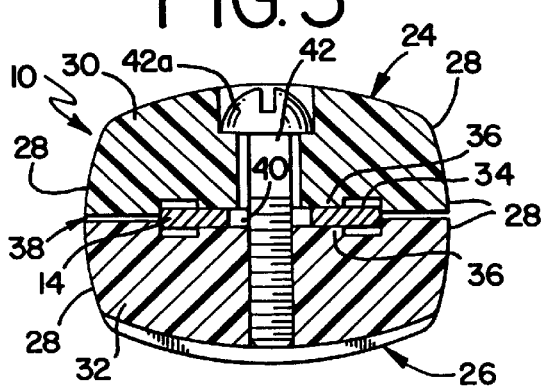
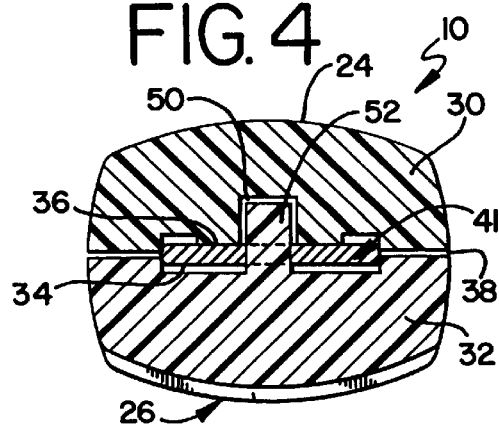

HANDLE ASSEMBLY FOR GRILL

TECHNICAL FIELD

The present invention relates generally to grills used for outdoor cooking, and particularly to a handle assembly which can be used on a lid or bowl of a grill.

BACKGROUND OF THE INVENTION

Grills used for outdoor cooking generally comprise a lower bowl, a food support frame mountable in the lower bowl, and a lid which serves to cover the lower bowl. The bowl is adapted to accommodate a heat-producing element below the food support frame, such as a gas burner or a rack to hold solid fuels, such as charcoal. The lid may be hingeably attached to the lower bowl of the grill or may be adapted to merely rest on peripheral portions of the lower bowl. Conventionally, handles are provided on the lid and the lower bowl for convenient manipulation of same.

One successful form of handle consists of a flat metal strap having a rectangular configuration. In other words, the strap has a generally straight center portion having opposed ends and a leg at each of the ends which extends generally perpendicularly from the straight portion. The legs are attached directly to the lid or the bowl, as the case may be. Because the lid and bowl can become very hot during cooking, thermally-insulating materials, such as wood, have been employed on the straight portion of the handle to prevent heat transfer.

One problem with these conventional strap handles is that even when a user grasps the insulated center portion of the handle, his or her hand may still come into contact with the legs of the handle, while hot, due to misplacement of the hand, or the handle slipping in the user's hand. Such slippage can be due to food greases on the hand or handle or merely an awkward grip.

The weight and diameter of a lid can make it cumbersome to control with conventional handles, especially when the lid is tilted sideways with one hand, such as when a user lifts the lid temporarily to tend to the comestibles being cooked. This lack of control can cause the lid to drop and/or cause burns by accidental contact.

Another problem with strap-type handles is insufficient durability against impacts, such as when a grill stored outdoors is blown over by wind. The strap-type handles are subject to lengthwise deformation, such as folding. When they are used on the lower bowl, the handles are mounted horizontally and, during use, frequently encounter forces which are transverse to a lengthwise dimension of the strap. As such, the straps are easily bent in that direction.

Thus, it is an object of the present invention to provide a handle for a lid or lower bowl which decreases the likelihood of accidental contact with hot elements, such as the legs of a strap.

It is also an object of the invention to provide a handle which provides improved one-handed control of a lifted or tilted lid.

Another object of the invention is to provide a strap-type handle for a lower bowl of a grill which has increased resistance to impact forces.

It is intended to provide these objects while providing a handle which is superior in construction and appearance, having relatively minimum cost and complexity of manufacture.

SUMMARY OF THE INVENTION

A handle assembly for a grill comprises a strap having a central portion and a pair of legs, preferably arcuate legs which extend from the central portion. An angle of greater than 90 degrees, and preferably about 120 degrees, is defined between each respective leg and the central portion. An insulating material substantially covers the central portion of the strap and extends down a portion of each leg. The insulating material has a defined cross-sectional shape and a defined lengthwise shape in the central portion.

The insulating material is shaped to provide improved grip, control, safety and comfort. Accordingly, a lengthwise shape of the insulating material may include an arcuate upper profile, an arcuate lower profile, or preferably both. A cross-sectional shape of the insulating material may also include an arcuate upper shape, an arcuate lower shape, or preferably both. Preferably, the arcuate upper shape and the arcuate lower shape of the cross-section are joined by straight sides. To enhance grip and add thermal radiation surface for cooling, the lengthwise shape of the insulating material may include surface ribs extending generally transverse to a lengthwise extent of the central portion, and preferably the ribs will be on the arcuate lower profile.

While a number of constructions are contemplated for providing the insulating material, one aspect of the present invention provides that the insulating material is comprised of first and second parts attachable around the strap. A means to secure, attach, or join the first and second parts to the strap is also provided. In a preferred embodiment, the first part is situated on an upper side of the strap and the second part is situated on a lower side of the strap. A channel is formed between the first part and the second part to accommodate the strap therebetween. The channel may be formed by a lengthwise recess in the first part, the second part, or by a recess in each of the first and second parts.

Primarily, to reduce thermal contact between the insulating material and the strap, an inner volume of the channel is dimensioned larger than the volume of the strap so as to define a gap between the insulating material and the strap. Lands are preferably provided within the channel to provide any necessary or desired positive contact between the first and second parts and the strap.

One means for joining the insulating material to the strap to avoid thermal contact by a user is to provide a through-hole in the strap through which a bolt or screw passes and fastens the first and second parts together on the strap. The through-hole being of sufficient diameter with respect to a diameter of the screw or bolt so that there is no contact between the screw and the strap. To ensure that no contact occurs due to misalignment of the through-hole and the screw, at least one alignment hole is provided in the strap. An alignment protrusion in the channel, preferably formed of the insulating material, cooperates with the alignment hole to properly align the insulating material on the strap. A recess in an outer surface of the insulating material may be provided to receive a head of the bolt or screw so that the bolt head is beneath an outer surface of the insulating material to avoid contact with a user's hand.

In another embodiment, the means for joining may include that one of either the first or second parts has an integral protrusion which extends through the through-hole in the strap and the other of either the first or second parts has a receptacle for receiving a portion of the protrusion in a mating fashion.

In an alternate embodiment, the first and second parts may be substantially identical halves. A channel formed between the halves accommodates the strap. Each half has a portion thereof extending onto both an upper and a lower side of the strap.

Because a preferred insulating material is a polymer, such insulating material may alternatively be molded or coated onto the strap.

Other advantages and aspects of the present invention will become apparent upon reading the following description of the drawings and detailed description of the invention.

BRIEF DESCRIPTION OF THE DRAWINGS

FIG. 1 is a perspective view of an exemplary handle according to the present invention, mounted on a lid;

FIG. 2 is a side view of the handle of FIG. 1 showing internal structure thereof in phantom;

FIG. 3 is a cross-sectional view of the handle of FIG. 1 taken along line 3—3 of FIG. 2;

FIG. 4 is a cross-sectional view of the handle of FIG. 1 taken along line 4—4 of FIG. 2;

DETAILED DESCRIPTION

Figure 5:
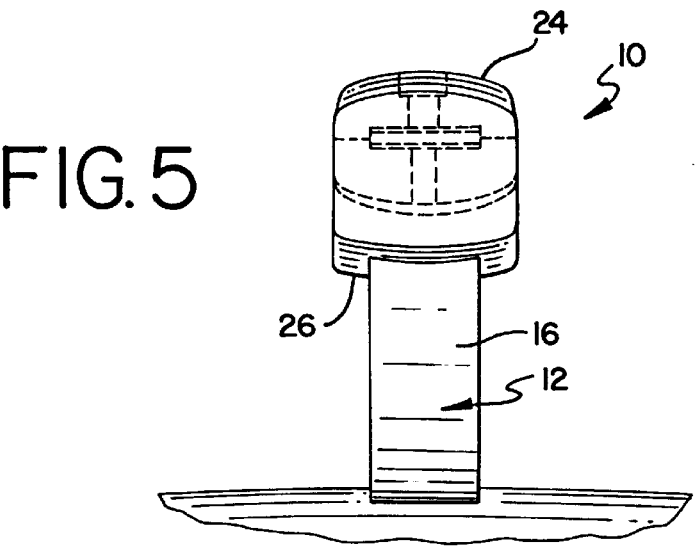
FIG. 5 is an end view of the handle of FIG. 1 showing internal structure in phantom.

While this invention is susceptible of embodiment in many different forms, there is shown in the drawings, and will herein be described in detail, preferred embodiments of the invention with the understanding that the present disclosure is to be considered as an exemplification of the principles of the invention and is not intended to limit the broad aspect of the invention to the embodiments illustrated.

FIGS. 1–7, disclose a handle assembly 10 for a grill as mounted on a lid (only shown in partial view and referenced by the letter "L"). As will be discussed in more detail below, FIGS. 8 and 9 disclose the handle 10 modified for mounting on a bowl of a grill (only shown in partial view and referenced by the letter "B").

Figure 6:
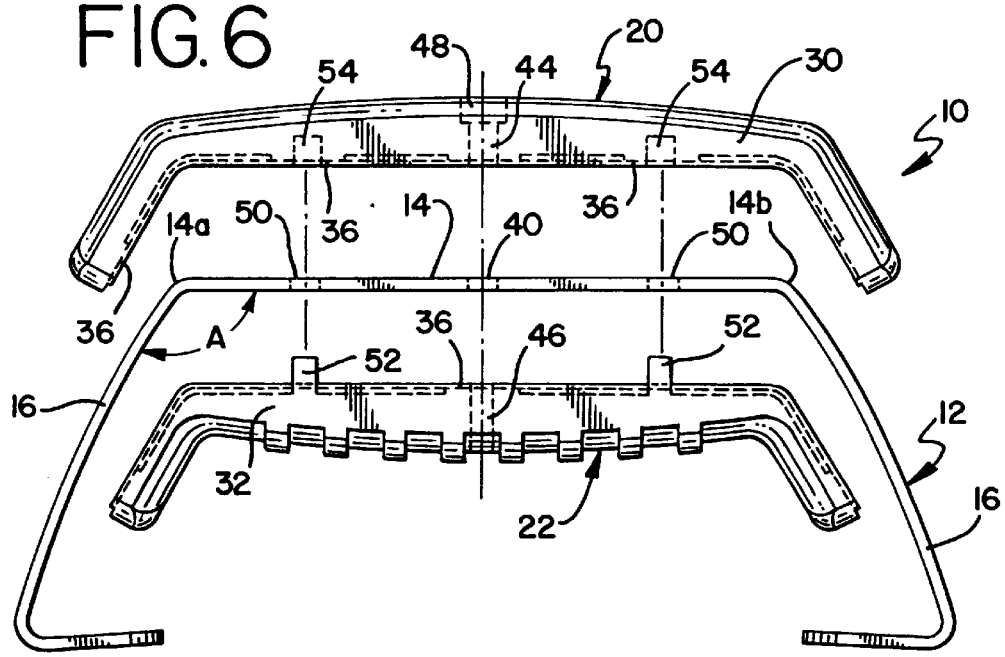
FIG. 6 is an exploded view of the handle of FIG. 1 showing internal structure in phantom.

The handle 10 includes a strap 12 having a central portion 14 with opposed first and second ends 14a and 14b, and a pair of legs 16. One of the legs 16 extends from the first end 14a of the central portion 14 and another leg 16 of the pair extending from the second end 14b of the central portion 14. An angle A, shown in FIG. 6, is defined between each respective leg and the central portion. According to one aspect of the invention, the angle A is greater than 90 degrees. A preferred angle, as disclosed in the Figures, is 120 degrees. This obtuse angle is believed to strengthen the handle 10 from impact forces acting along arrow F of FIG. 1. Also, the legs 16 are arcuate, which is believed to provide resilience upon impact from other directions, such as from above the handle 10.

An insulating material 18 substantially covers the central portion 14 of the strap 12 and extends down a portion of each leg 16. While the insulating material may be of any suitable impact-resistant material, it should have heat distortion or degradation temperatures in, or above the range of 200°–400° F. The insulating material 18 of handle 10 is 14% glass-filled nylon. This plastic is used with a handle height H (FIG. 2) from the surface of the lid L or bowl B of approximately two (2) inches.

The insulating material 18 of handle 10 extends down an inside and an outside portion of each leg 16 approximately one (1) inch. It should be noted, however, that any length or amount that the insulating material extends down at least the inside portion of the legs 16 will be helpful to block a finger from slipping into, or being misplaced onto, the legs 16 when they are hot.

To improve the grip and control of a lid, such as lid L when manipulated by the handle 10, a focus is made on the insulating material 18 having a defined cross-sectional shape and a defined lengthwise shape over the central portion 14 of strap 12.

As disclosed in FIGS. 1, 2 and 6, the lengthwise shape of the insulating material 18 includes an arcuate upper profile 20 and an arcuate lower profile 22. These profiles 20, 22 are thought to provide a better match with the inside shape of a closed hand, whether the handle 10 is gripped over-hand or under-hand. In the handle 10, the distance between ends 14a and 14b is approximately four (4) inches. The arcuate upper profile 20 has approximately a fifteen (15) inch radius of curvature and arcuate lower surface 22 has also approximately a fifteen (15) inch radius of curvature.

FIGS. 3, 4 and 5 disclose that the cross-sectional shape of the insulating material 18 includes an arcuate upper shape 24 and an arcuate lower shape 26 both of which have approximately a one-and-one-quarter (1.25") inch radius of curvature. Preferably, as in handle 10, the arcuate upper shape 24 and the arcuate lower shape 26 are joined by slightly arcuate (approximately one (1.0") inch radius of curvature) side profiles 28. These side profiles 28 may also be straight or have a smaller radius of curvature than one (1") inch.

To further enhance grip and control, the handle 10 is provided with surface ribs 28 along a lengthwise portion of insulating material 18. Preferably, the ribs 28 extend generally transverse to a lengthwise extent of the central portion 14. While the ribs 28 may extend along either or both of the arcuate upper profile 20 or the arcuate lower profile 22, in the exemplary embodiment of handle 10, the ribs 28 are presented only on the arcuate lower profile 22. It should be noted that for the purposes of defining the invention, the term "ribs" includes shapes from regular and repetitive geometric forms, such as disclosed in the Figures to alternating protrusions and recesses dimensioned to interdigitate with the fingers of the human hand.

According to a preferred method of manufacturing the handle 10, the insulating material is comprised of first and second parts 30, 32 attachable around the strap 12 with a means to secure, attach, or join the first and second parts to the strap. FIG. 6 discloses the first part 30 being situated on an upper side of the strap 12 and the second part 32 being situated on a lower side of the strap 12.

FIGS. 2, 3 and 4 disclose a channel 34 formed between the first part 30 and the second part 32, the channel 34 accommodating the strap 12. The channel 34 is preferably formed by a lengthwise recess in each of the first and second parts 30, 32. In other embodiments, a deeper recess in only one of the first part 30 or the second part 32 could provide the channel 34.

As disclosed in FIGS. 2, 3 and 4, an inner volume of the channel 34 is larger than the volume of the strap 12 so as to define an air space between the insulating material 18 and the strap 12. FIGS. 4, 5 and 6 disclose lands 36 within the channel 34 which are provided to give positive contact between the first and second parts 30, 32 and the strap 12 for structural integrity. The air space provides additional insulation against thermal conductivity from the strap 12 into the insulating material 18.

As disclosed in FIGS. 1, 3 and 4, the first and second parts 30, 32 are not touching along a periphery of each so as to define a peripheral gap 38 therebetween. The gap 38 provides ventilation to the air space in channel 34, room for expansion of the insulating material 18, and adds to an aesthetic appearance of the handle 10.

As disclosed in FIGS. 3 and 6, a through-hole 40 is provided in the strap 12 for permitting a portion of a means to join the first and second parts 30, 32 to the strap 12 to pass therethrough. In the embodiment of handle 10, the means for joining is a bolt 42. The bolt 42 passes through: a hole 44 in the first part 30; the through hole 40; and, into a threaded hole 46 in the second part 32 of the insulating material 18 (FIGS. 2, 3 and 6). As disclosed in FIG. 3, the through-hole 40 is of sufficient diameter with respect to a diameter of the bolt 42 so that there is no thermal contact between the bolt 42 and the strap 12. A recess 48 in an outer surface of the insulating material 18 is provided to receive a head 42a of the bolt 42 so that the bolt head 42a is beneath an outer surface of the insulating material 18 to avoid contact with a user's hand.

As particularly disclosed in FIG. 4, handle 10 also includes a pair of alignment holes 50 in the strap 12 and a pair of alignment protrusions 52 in the channel 34 for cooperating with the alignment holes 50 to align the insulating material 18. Receptacles 54 in the first part 30 also receive a portion of protrusions 52 which extend into the receptacles 54 for additional alignment between parts 30, 32. These alignments are particularly useful for preventing the bolt 42 from shifting into contact with strap 12. This alignment could also be achieved by other means, such as providing one or more protrusions (not shown) on the strap 12 and one or more receptacles (not shown) in the channel 34, the protrusion(s) and receptacle(s) cooperating to align the insulating material 18.

Other means for joining can be provided. For example, the bolt 42 could be secured by a nut (not shown) in the second part 32. Such a nut could be similarly positioned in a recess such as recess 48. Also, the means for joining may include that one of either the first or second parts 30, 32 has one or more integral protrusions (not shown) which extend through through-holes, such as hole 40, in the strap, while the other of either the first or second parts 30, 32 has one or more receptacles (not shown) to receive a portion of the protrusions in a mating fashion.

In another embodiment (not shown), the first and second parts of insulating material could be substantially identical halves, a channel formed between the halves to accommodate the strap, each half having a portion thereof extending onto both an upper and a lower side of the strap. Also, for plastic insulating material, the plastic may be molded or coated directly onto the strap.

It should be noted that "strap" for the purposes of this invention can be: metal, polymer, or composite materials; can be flat with rectangular cross-section; can be of rounded cross-section; and can be non-continuous, such as segments, for example, being discontinuous between the legs of the handle.

Figure 7:
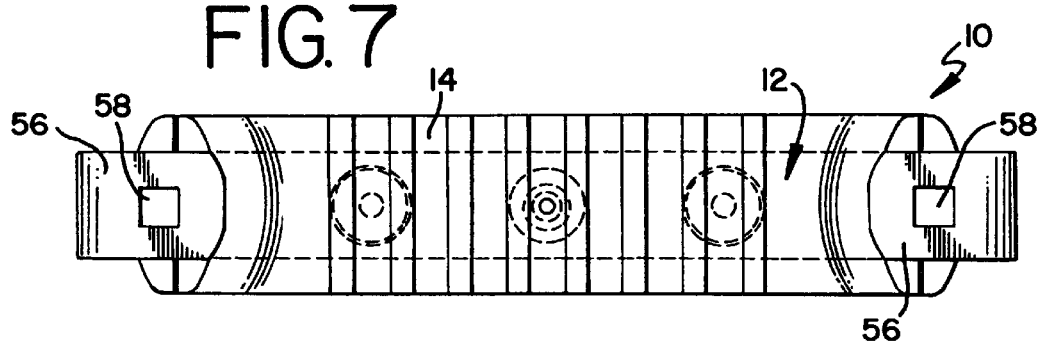
FIG. 7 is a bottom view of the handle of FIG. 1 showing internal structure in phantom.
Figure 8:
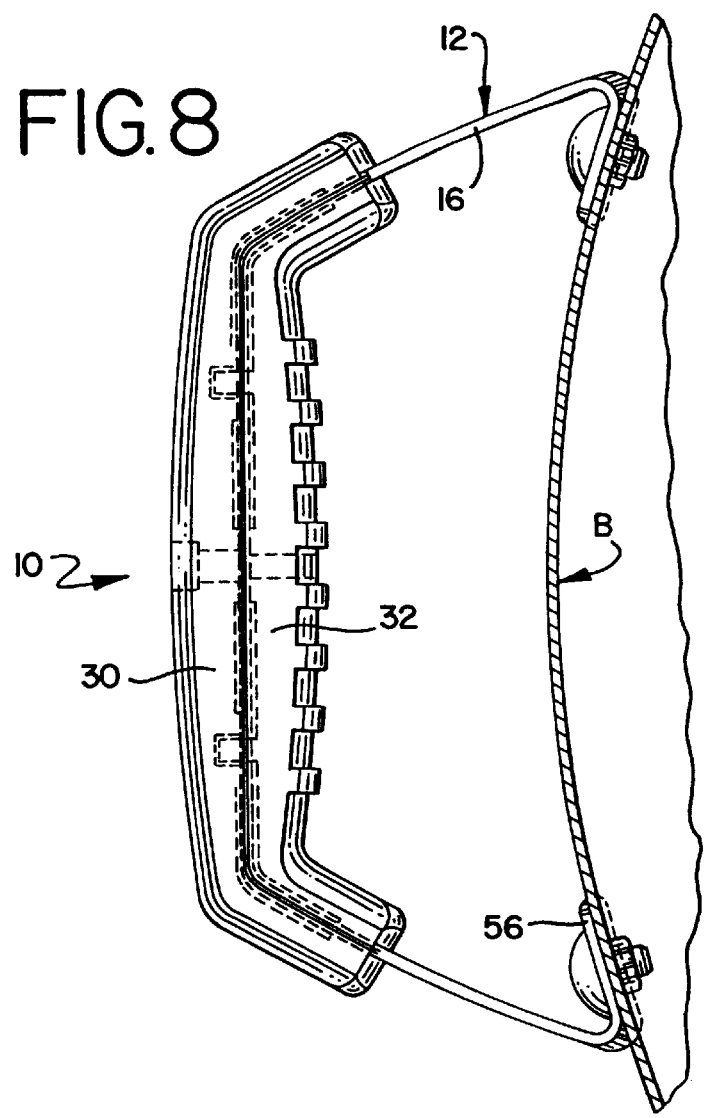
FIG. 8 is a side view of the handle of FIG. 1, modified for mounting to a bowl, showing internal structure in phantom; and, FIG. 9 is an end view of the handle of FIG. 8 showing internal structure in phantom.
Figure 9:
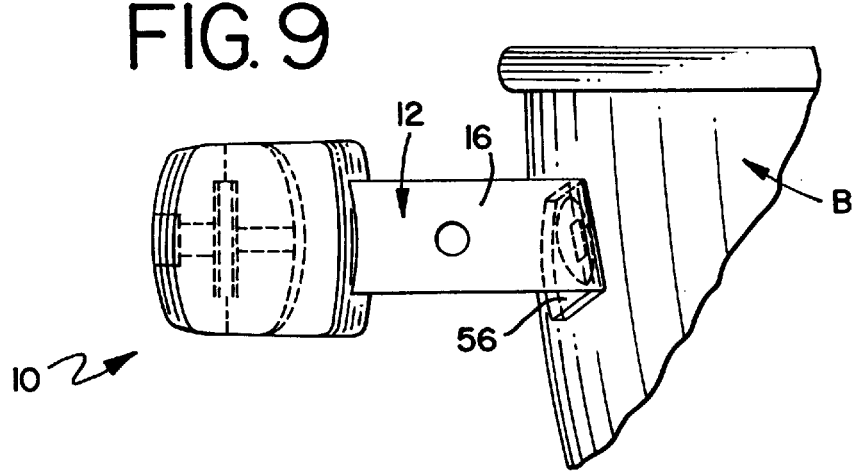

The legs 16 of handle 10 each include an inwardly-turned foot 56 with a square hole 58 for mounting the handle 10 with, such as, carriage bolts (see FIG. 7). FIGS. 8 and 9 disclose handle 10 with the feet 56 modified to be turned out-of-plane with the lengthwise dimension of the handle 10. In this configuration, the handle 10, when mounted to a bowl, has increased resistance to transverse downward forces.

While the specific embodiments have been illustrated and described, numerous other modifications come to mind without significantly departing from the spirit of the invention and the scope of protection is only limited by the scope of the accompanying claims.

What we claim is:

1. A handle assembly for a grill comprising:
    a strap having a central portion having opposed first and second ends;
    a pair of legs, one of the legs extending from the first end of the central portion and another leg of the pair extending from the second end of the central portion, an angle being defined between each respective leg and the central portion;
    an insulating material on the strap, the insulating material defining a channel for accommodating the strap, the channel having an inner volume larger than the volume of the strap to define an air space between the insulating material and the strap, and the insulating material substantially covering the central portion of the strap and extending therefrom down a portion of each leg, the insulating material having a defined cross-sectional shape and a defined lengthwise shape in the central portion.

2. The handle assembly of claim 1, wherein the angle is greater than 90°.

3. The handle assembly of claim 2, wherein the legs are arcuate.

4. The handle assembly of claim 3, wherein the lengthwise shape of the insulating material includes surface ribs extending generally transverse to a lengthwise extent of the central portion.

5. The handle assembly of claim 3, wherein the lengthwise shape of the insulating material includes an arcuate upper and an arcuate lower profile.

6. The handle assembly of claim 2, wherein the lengthwise shape of the insulating material includes an arcuate upper and an arcuate lower profile.

7. The handle assembly of claim 2, wherein the arcuate lower profile of the insulating material includes an arcuate upper and an arcuate lower profile; and,
    wherein the arcuate lower profile of the insulating material includes surface ribs extending generally transverse to a lengthwise extent of the central portion.

8. The handle assembly of claim 1, wherein the angle is 120°.

9. The handle assembly of claim 8, wherein the legs are arcuate.

10. The handle assembly of claim 1, wherein the legs are arcuate.

11. The handle assembly of claim 1, wherein each leg having a length and the insulating material extends down each leg at least 0.5 inch down the length as measured from the respective ends of the central portion of the strap.

12. The handle assembly of claim 1, wherein the lengthwise shape of the insulating material includes an arcuate upper profile.

13. The handle assembly of claim 1, wherein the lengthwise shape of the insulating material includes an arcuate lower profile.

14. The handle assembly of claim 13, wherein the arcuate lower profile of the insulating material includes surface ribs extending generally transverse to a lengthwise extent of the central portion.

15. The handle assembly of claim 1, wherein the lengthwise shape of the insulating material includes an arcuate upper and an arcuate lower profile.

16. The handle assembly of claim 15, wherein the arcuate lower profile of the insulating material includes surface ribs extending generally transverse to a lengthwise extent of the central portion.

17. The handle assembly of claim 15, wherein the cross-sectional shape of the insulating material includes an arcuate upper shape and an arcuate lower shape;

wherein the arcuate upper shape and the arcuate lower shape are joined by arcuate sides; and, wherein the arcuate lower profile of the insulating material includes surface ribs extending generally transverse to a lengthwise extent of the central portion.

18. The handle assembly of claim 1, wherein the cross-sectional shape of the insulating material includes an arcuate upper shape and an arcuate lower shape.

19. The handle assembly of claim 11, wherein the arcuate upper shape and the arcuate lower shape are joined by straight side profiles.

20. The handle assembly of claim 18, wherein the arcuate upper shape and the arcuate lower shape are joined by arcuate side profiles.

21. The handle assembly of claim 1, wherein the lengthwise shape of the insulating material includes surface ribs extending generally transverse to a lengthwise extent of the central portion.

22. The handle assembly of claim 1, wherein the insulating material is comprised of first and second parts, attachable around the strap, and the handle includes a means to join the first and second parts to the strap.

23. The handle assembly of claim 22, wherein the first part being situated on an upper side of the strap and the second part being situated on a lower side of the strap.

24. The handle assembly of claim 22, wherein the channel is formed by a lengthwise recess in the first part.

25. The handle assembly of claim 22, wherein the channel is formed by a recess in the second part.

26. The handle assembly of claim 22, wherein the channel is defined by a recess in each of the first and second parts.

27. The handle assembly of claim 22, further including lands within the channel to provide positive contact between the first and second parts and the strap.

28. The handle assembly of claim 22, further including a peripheral gap between the first and second parts, the gap interconnecting with the air space in the channel.

29. The handle assembly of claim 22, further including at least one through-hole in the strap for permitting a portion of the means to join the first and second parts to the strap to pass therethrough.

30. The handle assembly of claim 29, wherein the means for joining including that one of either the first or second parts has a protrusion which extends through the through-hole in the strap and the other of either the first or second parts has a receptacle for receiving a portion of the protrusion in a mating fashion.

31. The handle assembly of claim 29, wherein the means to join is a bolt and the through-hole has a larger diameter with respect to a diameter of a portion of the bolt passing therethrough so that there is no contact between the portion and the strap.

32. The handle assembly of claim 31, further including at least one alignment hole in the strap and one alignment protrusion in the channel cooperating with the alignment hole to align the insulating material.

33. The handle assembly of claim 31, further including at least one protrusion on the strap and one receptacle in the channel, the protrusion and receptacle cooperating to align the insulating material.

34. The handle assembly of claim 31, further including a recess in an outer surface of the insulating material to receive a head of the bolt so that the bolt head is beneath an outer surface of the insulating material to avoid contact with a user's hand.

35. The handle assembly of claim 1, wherein the insulating material is plastic, and the plastic being molded onto the strap.

36. The handle assembly of claim 22, further including a peripheral gap between the first part and the second part.

* * * * *